(12) United States Patent
Yang et al.

(10) Patent No.: US 9,936,634 B2
(45) Date of Patent: Apr. 10, 2018

(54) POWER TOOL AND CONTROL METHOD THEREOF

(71) Applicant: CHERVON (HK) LIMITED, Wanchai (HK)

(72) Inventors: Dezhong Yang, Nanjing (CN); Chao Xian, Nanjing (CN); Haiyan Li, Nanjing (CN)

(73) Assignee: Chervon (HK) Limited, Wanchai (HK)

( * ) Notice: Subject to any disclaimer, the term of this patent is extended or adjusted under 35 U.S.C. 154(b) by 0 days.

(21) Appl. No.: 15/290,086

(22) Filed: Oct. 11, 2016

(65) Prior Publication Data
US 2017/0105339 A1 Apr. 20, 2017

(30) Foreign Application Priority Data
Oct. 14, 2015 (CN) .......................... 2015 1 0662263

(51) Int. Cl.
| | |
|---|---|
| A01D 34/00 | (2006.01) |
| A01D 34/58 | (2006.01) |
| A01D 34/78 | (2006.01) |
| H02K 11/21 | (2016.01) |
| A01D 34/68 | (2006.01) |
| H02P 29/00 | (2016.01) |
| A01D 101/00 | (2006.01) |

(52) U.S. Cl.
CPC .......... *A01D 34/006* (2013.01); *A01D 34/58* (2013.01); *A01D 34/6806* (2013.01); *A01D 34/78* (2013.01); *H02K 11/21* (2016.01); *H02P 29/00* (2013.01); *A01D 2101/00* (2013.01)

(58) Field of Classification Search
CPC ...... A01D 34/006; A01D 34/78; A01D 63/00; A01D 67/00; A01D 34/58; A01D 34/6806; B60L 11/1805; B60L 11/126; B60L 11/1857; B60L 11/1861; B60L 2200/40; H02P 7/2913; H02P 29/00; H02H 7/093; H02H 7/29; H02H 7/2913; H02K 11/21
USPC ...... 56/10.2 R, 16.9, 10.2 G, 11.9; 180/65.8; 318/268, 400.34, 599, 779; 701/36, 50
See application file for complete search history.

(56) References Cited

U.S. PATENT DOCUMENTS

| | | | | |
|---|---|---|---|---|
| 3,809,975 | A * | 5/1974 | Bartels ...................... | H02P 7/29 318/139 |
| 4,914,592 | A * | 4/1990 | Callahan ............... | F16H 61/456 180/415 |

(Continued)

FOREIGN PATENT DOCUMENTS

WO 2012/175901 A1 12/2012

OTHER PUBLICATIONS

CIPO, Office Action issued on Canadian patent application No. 2,945,013, dated Jul. 19, 2017, 3 pages.

*Primary Examiner* — Robert E Pezzuto
(74) *Attorney, Agent, or Firm* — Greenberg Traurig, LLP

(57) ABSTRACT

A power tool includes an electric motor, a functional accessory capable of being driven by the electric motor, a detection device for detecting a rotational speed of the electric motor, and a controller for controlling the electric motor with a control signal. The control is operable to estimate a load parameter according to a duty cycle of the control signal and the rotational speed of the electric motor such that the electric motor is caused to be operated by the controller with a lower rotational speed under a lower load and a higher rotational speed under a higher load.

11 Claims, 3 Drawing Sheets

(56) References Cited

U.S. PATENT DOCUMENTS

| | | | | |
|---|---|---|---|---|
| 5,937,622 | A | * | 8/1999 | Carrier .................. A01D 34/006 56/10.2 R |
| 6,745,117 | B1 | * | 6/2004 | Thacher .................. A01B 63/00 180/65.8 |
| 7,417,389 | B2 | * | 8/2008 | Shaw .................... H02P 7/2913 318/268 |

* cited by examiner

POWER TOOL AND CONTROL METHOD THEREOF

CROSS REFERENCE

This application claims priority to Chinese Patent Application No. 201510662263.3, entitled "POWER TOOL AND CONTROL METHOD THEREOF", filed with the Chinese Patent Office on Oct. 14, 2015, which is incorporated herein by reference in its entirety.

TECHNICAL FIELD

The disclosure relates to a power tool and a control method thereof.

BACKGROUND

Current power tools generally control rotational speed of an electric motor by controlling a duty cycle control turn-on of the electric motor. Some current power tools such as electric lawnmowers obtain a constant rotational speed by outputting a constant duty cycle. During an actual operation process of the tools, e.g., during a mowing process of electric lawnmowers, since variation of density degree of grasses would result in variation of load of the electric motor, under a constant duty cycle, the rotational speed of the electric motor, according to characteristics of the electric motor itself, would be varied with the variation of the load, that is, the rotational speed is reduced when the load is increased and increased when the load is reduced. However, users usually desire a higher rotational speed in the case of dense grasses and a lower rotational speed in the case of sparse grasses.

SUMMARY

One aspect of the present disclosure provides a power tool including: an electric motor, a functional accessory capable of being driven by the electric motor; a detection device for detecting a rotational speed of the electric motor; and a controller for controlling the electric motor with a control signal, the controller is capable of estimating a load parameter according to a duty cycle of the control signal and the rotational speed of the electric motor such that the electric motor has a lower rotational speed under a lower load and a higher rotational speed under a higher load.

Preferably, the controller drives the electric motor to rotate at a constant speed within a certain load range according to a constant speed mode corresponding to the load parameter.

Preferably, the controller adjusts the duty cycle of the control signal according to a detection result of the detection device such that the rotational speed of the electric motor keeps constant at a rotational speed corresponding to the constant speed mode.

Preferably, the load parameter is a product of the duty cycle of the control signal and the rotational speed of the electric motor.

Preferably, the power tool is an electric lawnmower, and the functional accessory is a mowing blade driven by the electric motor.

Another aspect of the present disclosure provides a control method of power tool including: detecting a rotational speed of an electric motor; estimating a load parameter according to the rotational speed of the electric motor and a duty cycle of a control signal driving the electric motor; selecting a constant speed mode from a plurality of constant speed modes according to the load parameter; and driving the electric motor at a rotational speed corresponding to the constant speed mode.

Preferably, the constant speed mode is selected according to a difference between a current load parameter and an initial load parameter.

Preferably, each of the constant speed modes has a predetermined rotational speed, and the duty cycle of the control signal controlling the electric motor is reduced when an actual rotational speed of the electric motor is greater than the predetermined rotational speed of the selected constant speed mode.

Preferably, the rotational speed of the electric motor is detected by detecting a back electromotive force of the electric motor.

Preferably, the power tool is a lawnmower, and the electric motor drives a grass-cutting blade of the lawnmower.

An advantage of the disclosure is that the rotational speed of the electric motor can be changed according to variation of a load to satisfy actual working conditions.

DETAILED DESCRIPTION

Detailed description of the disclosure will be given below with reference to the drawings and specific embodiments.

Figure 1:
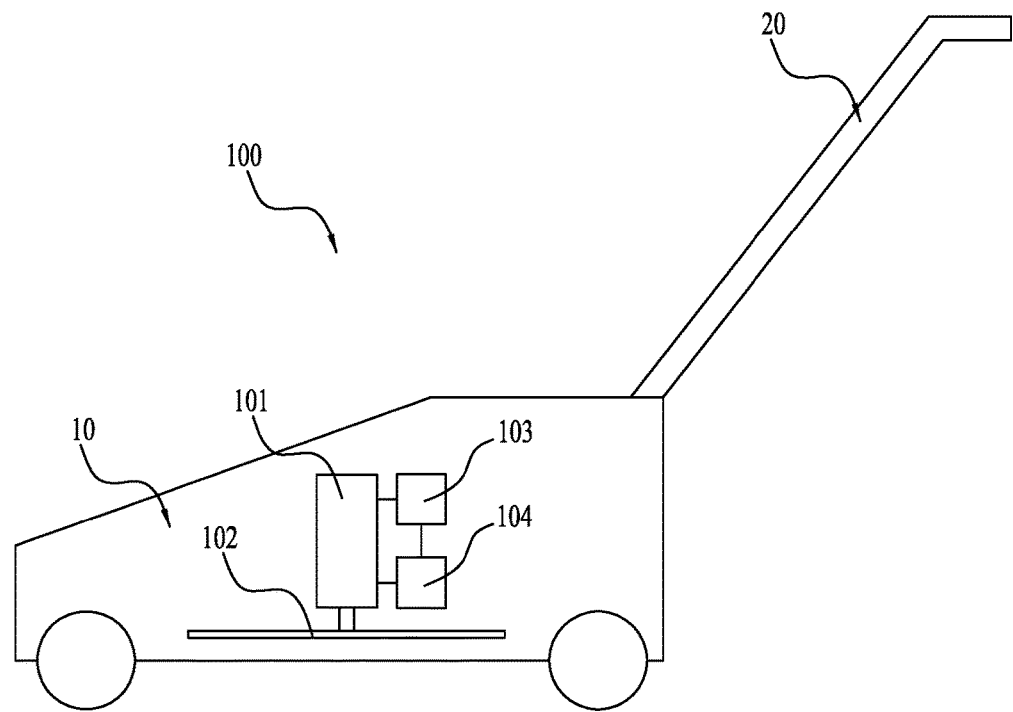
FIG. 1 is a schematic structure view of an exemplary electric lawnmower.

A power tool 100 as shown in FIG. 1 includes a main machine 10 and an operation handle 20. The power tool 100 in the illustrated embodiment is a lawnmower. It should be noted that the power tool is not limited to a lawnmower, and may be a grass trimmer or other similar power tools.

The main machine 10 includes an electric motor 101, a functional accessory 102, a detection device 103 and a controller 104.

The functional accessory 102 is a grass-cutting blade, and the electric motor 101 can drive the functional accessory 102 to rotate to achieve the function of the lawnmower 100.

The detection device 103 is used for detecting a rotational speed of the electric motor 101. The rotational speed of the electric motor 101 may be detected by a sensor directly detecting position variation of an electric motor shaft or other components connected to the electric motor shaft. Alternatively, the rotating speed of the electric motor 101 may also be detected by detection of electrical parameter(s) of the electric motor 101, e.g., by detection of a back electromotive force of the electric motor 101.

The controller 104 is used for controlling the electric motor 101. The controller 104 is capable of sending a control signal to a drive circuit for driving the electric motor 101 to control the electric motor 101. A duty cycle of the control signal determines a duty cycle of windings of the electric motor 101 in an on-state, thus the controller 104 can control the rotational speed of the electric motor 101 according to the duty cycle of the control signal.

The controller 104, when making active control, can perform estimation and control according to signals of the detection device 103. For example, the controller 104 estimates a load parameter according to the rotational speed of the electric motor 101 and the duty cycle of the control signals of the controller itself. When the load parameter reflects that there is a lower load, the electric motor 101 has a lower rotational speed. And when the load parameter reflects that there is a higher load, the electric motor 101 has a higher rotational speed.

The controller 104 can correspondingly select a set constant speed mode according to the estimated load parameter, such that the electric motor 101 is driven at a predetermined speed corresponding to the constant speed mode.

The controller adjusts the duty cycle of the control signal according to a detection result of the detection device such that the rotational speed of the electric motor keeps constant at a predetermined rotational speed corresponding to the constant speed mode. It should be noted that the constant speed mode corresponds to one rotational speed, and it is hoped that, during control, the electric motor 101 keeps constant at this rotational speed when a set rotational speed remains the same. However, as a matter of fact, during the control, it is possible that an actual rotational speed of the electric motor 101 may fluctuate near the set rotational speed because of characteristics of the electric motor and lagging of the control.

The load parameter can be estimated with a formula F=SP, wherein the load parameter is indicated by F, the rotational speed of the electric motor is indicated by S, and the duty cycle of the control signal is indicated by P. That is, the load parameter is a product of the duty cycle of the control signal and the rotational speed of the electric motor.

The control method of the disclosure mainly includes: detecting a rotational speed of an electric motor; estimating a load parameter according to the rotational speed of the electric motor and a duty cycle of a control signal driving the electric motor; selecting a constant speed mode according to the load parameter; and driving the electric motor at a rotational speed corresponding to the constant speed mode.

More specifically, the method selects a constant speed mode according to a difference between a current load parameter and an initial load parameter.

In addition, each of the constant speed modes corresponding to a predetermined rotational speed, and the duty cycle of the control signal controlling the electric motor is reduced when an actual rotational speed of the electric motor is greater than the predetermined rotational speed.

Figure 2:
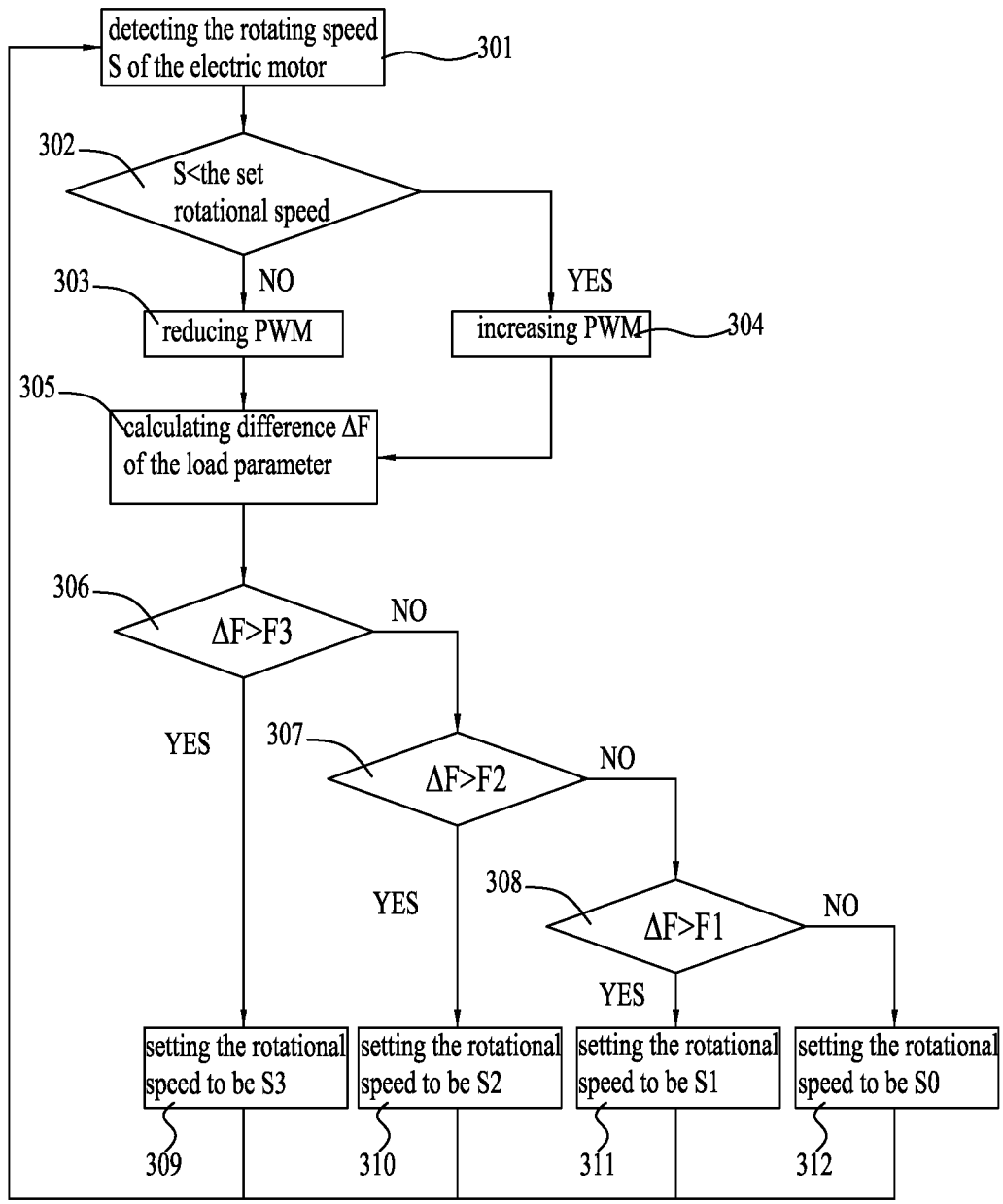
FIG. 2 is a schematic flow chart of an exemplary control method of the lawnmower as shown in FIG. 1.

Referring to FIG. 2, the method in the illustrated embodiment, includes the following steps:

step 301: detecting the rotational speed S of the electric motor 101, and then turning to step 302.

step 302: determining whether the detected rotational speed S of the electric motor 101 is lower than the set rotational speed; if yes, turning to step 304, and if no, turning to step 303.

step 303: reducing the duty cycle of the control signal, and then turning to step 305.

step 304: increasing the duty cycle of the control signal, and then turning to step 305.

step 305: estimating the difference $\Delta F$ of the load parameter, and then turning to step 306. Specifically, the electric motor 101 is driven to rotate under control with the initial rotational speed S0 and the initial duty cycle P0 at the beginning of the start of operation, and then the initial load parameter F0 could be obtained. In the subsequent control, the load parameter F for estimation is obtained by using the speed S detected in step 301 and the duty cycle P output in step 303 or 304. The difference $\Delta F$ is F1−F0 at the first estimation, and the difference $\Delta F$ is F2−F1 at the second estimation, and the rest could be obtained by analogy.

step 306: determining whether the difference $\Delta F$ of the load parameter is larger than a first preset value F3; if yes, turning to step 309, and if no, turning to step 307.

step 307: determining whether the difference $\Delta F$ of the load parameter is larger than a first preset value F2; if yes, turning to step 310, and if no, turning to step 308.

step 308: determining whether the difference $\Delta F$ of the load parameter is larger than a first preset value F1; if yes, turning to step 311, and if no, turning to step 312.

step 309: setting the speed to be S3, and returning to step 301.

step 310: setting the speed to be S2, and returning to step 301.

step 311: setting the speed to be S1, and returning to step 301.

step 312: setting the speed to be S0, and returning to step 301.

Figure 3:
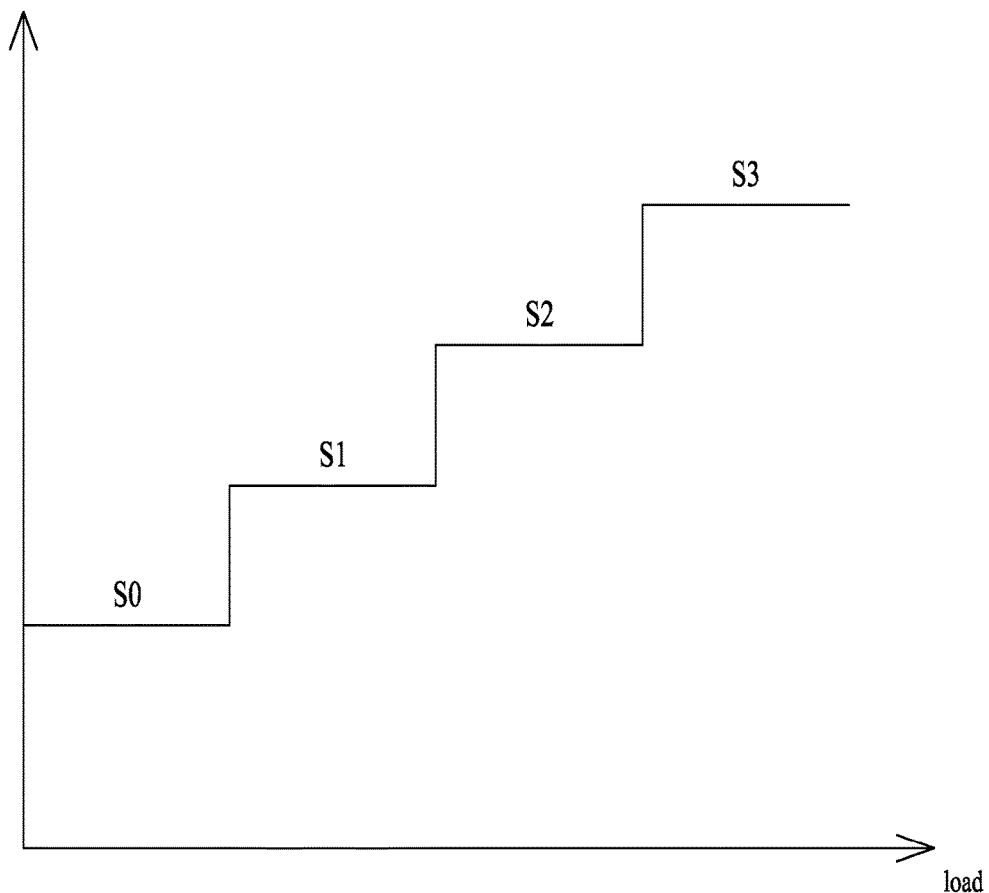
FIG. 3 is a diagram showing a relationship of load and rotational speed in the event that the lawnmower as shown in FIG. 1 uses the method as shown in FIG. 2.

In the above description, the speed is divided into four modes, wherein S3>S2>S1>S0, and F3>F2>F1>F0, which can be referred to when setting a plurality of modes. The load parameter F is equal to a product of the rotational speed S and the duty cycle P, which can reflect real-time load. The method by using the difference corresponding to the rotational speed can effectively reflect requirements of the load for the rotational speed. According to the above technical solution, variation of the rotational speed with the load as shown in FIG. 3 can be obtained. It should be noted that when the load is increased, the rotational speed rises in a stepped manner, which is more in line with actual working conditions of such power tools as lawnmowers, thereby improving efficiency.

The basic principle, main characteristics and advantages of the present disclosure have been shown and described above. Persons skilled in the art should understand that the disclosure is not limited by the above embodiment in any way. All technical solutions obtained by using equivalent substitution or equivalent variation fall into the scope of protection of the present disclosure.

What is claimed is:

1. A power tool, comprising:
an electric motor;
a functional accessory capable of being driven by the electric motor;
a detection device for detecting a rotational speed of the electric motor; and
a controller for controlling the rotational speed of the electric motor via use of a control signal to cause the electric motor to operate at a lower rotational speed under a lower load and at a higher rotational speed under a higher load, the controller being operable to estimate a load parameter according to a duty cycle of the control signal and the rotational speed of the electric motor whereby the estimated load parameter is used by the controller to control the rotational speed of the electric motor.

2. The power tool according to claim 1, wherein the controller drives the electric motor to rotate at a constant rotational speed within a certain load range according to a constant speed mode corresponding to the load parameter.

3. The power tool according to claim 2, wherein the controller adjusts the duty cycle of the control signal according to a detection result of the detection device such that the rotational speed of the electric motor keeps constant at a predetermined rotational speed corresponding to the constant speed mode.

4. The power tool according to claim 1, wherein the load parameter is a product of the duty cycle of the control signal and the rotational speed of the electric motor.

5. The power tool according to claim 4, wherein the power tool is an electric lawnmower and the functional accessory is a mowing blade driven by the electric motor.

6. A control method for controlling the operation of a power tool comprising an electric motor and a functional accessory operably coupled to the electric motor to be driven by the electric motor, the control method comprising:
detecting a rotational speed of the electric motor;
controlling the rotational speed of the electric motor via use of a control signal, to cause the electric motor to operate at a lower rotational speed under a lower load and at a higher rotational speed under a higher load;
estimating a load parameter according to the rotational speed of the electric motor and a duty cycle of the control signal, and using the estimated load parameter for controlling the rotational speed of the electric motor.

7. The control method according to claim 6, further comprising:
selecting a constant speed mode from a plurality of constant speed modes according to the load parameter; and
driving the electric motor at a rotational speed corresponding to the selected constant speed mode.

8. The control method according to claim 7, wherein each of the plurality of constant speed modes has a predetermined rotational speed, and the duty cycle of the control signal controlling the electric motor is reduced when an actual rotational speed of the electric motor is greater than the predetermined rotational speed of the selected constant speed mode.

9. The control method according to claim 7, wherein the rotational speed of the electric motor is detected by detecting a back electromotive force of the electric motor.

10. The control method according to claim 7, wherein the power tool is a lawnmower and the electric motor drives a grass-cutting blade of the lawnmower.

11. The control method according to claim 7, wherein the constant speed mode is selected according to a difference between a current load parameter and an initial load parameter.

* * * * *